(12) United States Patent
Ziegenhorn et al.

(10) Patent No.: US 8,777,030 B2
(45) Date of Patent: Jul. 15, 2014

(54) NON-REUSABLE CLOSURE

(75) Inventors: David Ziegenhorn, Grayslake, IL (US); Jay Hinkle, Bartlett, IL (US); Greg Showers, Spring Grove, IL (US); Kerry D. Azelton, Pleasanton, CA (US); Stacie M. Alvarez, Pleasanton, CA (US)

(73) Assignee: The Clorox Company, Oakland, CA (US)

( * ) Notice: Subject to any disclaimer, the term of this patent is extended or adjusted under 35 U.S.C. 154(b) by 0 days.

(21) Appl. No.: 13/467,977

(22) Filed: May 9, 2012

(65) Prior Publication Data

US 2013/0119062 A1 May 16, 2013

(30) Foreign Application Priority Data

May 10, 2011 (GB) .................................. 1107758.3

(51) Int. Cl.
*B65D 45/00* (2006.01)

(52) U.S. Cl.
USPC ..... 215/235; 215/237; 220/255.1; 220/259.1; 220/266; 222/541.1; 222/541.6; 222/556

(58) Field of Classification Search
CPC ........... B65D 47/0804; B65D 47/0838; B65D 47/243; B65D 47/36; B65D 49/12; B65D 2101/0023; B65D 2101/0038
USPC ......... 215/224, 235, 237, 250–251, 253–255, 215/263; 220/254.1, 254.3–54.5, 255.1, 220/258.1, 258.3, 259.1, 265–266, 220/269–270, FOR. 206; 222/541.1, 222/541.5–541.6, 556
See application file for complete search history.

(56) References Cited

U.S. PATENT DOCUMENTS

| | | | |
|---|---|---|---|
| 4,471,878 A | | 9/1984 | Davis et al. |
| 4,487,324 A | * | 12/1984 | Ostrowsky .................... 215/253 |
| 4,598,833 A | | 7/1986 | Herr |
| 4,718,567 A | * | 1/1988 | La Vange ..................... 215/206 |
| 4,726,483 A | | 2/1988 | Drozd |
| 4,759,455 A | * | 7/1988 | Wilson ......................... 215/211 |
| 5,067,624 A | * | 11/1991 | Thanisch ...................... 215/235 |
| 5,096,077 A | * | 3/1992 | Odet et al. ................... 215/211 |
| 5,221,017 A | * | 6/1993 | Cistone et al. ............... 215/235 |
| 5,386,918 A | * | 2/1995 | Neveras et al. .............. 215/235 |
| 5,390,805 A | * | 2/1995 | Bilani et al. .................. 215/260 |
| 5,392,938 A | * | 2/1995 | Dubach ......................... 215/254 |

(Continued)

FOREIGN PATENT DOCUMENTS

| | | |
|---|---|---|
| EP | 1503942 B | 5/2006 |
| EP | 2144821 | 12/2011 |

(Continued)

OTHER PUBLICATIONS

International Search Report, mailed Jul. 26, 2012, from counterpart PCT/US 12/37173, filing date May 9, 2012.

*Primary Examiner* — Mickey Yu
*Assistant Examiner* — Brijesh V. Patel
(74) *Attorney, Agent, or Firm* — Ann Lee

(57) ABSTRACT

In various embodiments, a non-reusable closure may include a base attachable to a container. The closure base contains an engagement insert that can screw onto a container neck. The base and engagement insert together contain one or more regions of weakness which break and/or deform when the closure is removed from the container thereby preventing re-attachment of the closure to the container.

15 Claims, 4 Drawing Sheets

(56) References Cited

U.S. PATENT DOCUMENTS

| | | | |
|---|---|---|---|
| 5,497,906 A * | 3/1996 | Dubach | 222/23 |
| 5,547,091 A | 8/1996 | Neveras et al. | |
| 5,632,420 A * | 5/1997 | Lohrman et al. | 222/212 |
| 5,947,315 A | 9/1999 | Valyi et al. | |
| 6,053,375 A * | 4/2000 | Schwartz et al. | 222/567 |
| 6,672,487 B1 * | 1/2004 | Lohrman | 222/213 |
| 6,766,926 B1 | 7/2004 | Elchert | |
| 6,848,603 B2 * | 2/2005 | Gaiser et al. | 222/153.1 |
| 2004/0069806 A1 * | 4/2004 | Benoit-Gonin et al. | 222/153.06 |
| 2005/0279727 A1 | 12/2005 | Graswald et al. | |
| 2006/0043052 A1 * | 3/2006 | Lin | 215/253 |
| 2006/0186077 A1 * | 8/2006 | Robinson | 215/237 |
| 2007/0023462 A1 * | 2/2007 | Pugne | 222/556 |
| 2007/0029352 A1 * | 2/2007 | Norris et al. | 222/494 |
| 2008/0314860 A1 | 12/2008 | Pugne et al. | |
| 2009/0107948 A1 | 4/2009 | Brand et al. | |
| 2010/0282705 A1 | 11/2010 | Ledemeney | |

FOREIGN PATENT DOCUMENTS

| | | |
|---|---|---|
| JP | 11011508 | 1/1990 |
| WO | WO0130663 | 5/2001 |
| WO | WO2008139196 | 11/2008 |
| WO | WO2009002717 | 12/2008 |
| WO | WO2009055409 | 4/2009 |

* cited by examiner

SECTION A-A

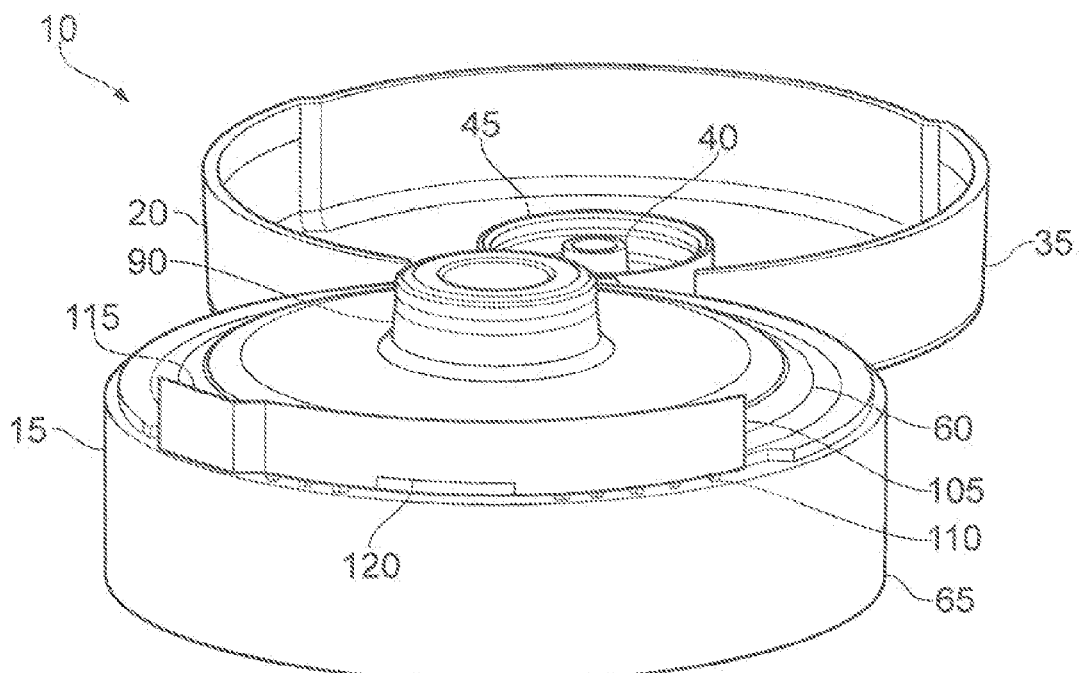
FIG. 6 (AMENDED)

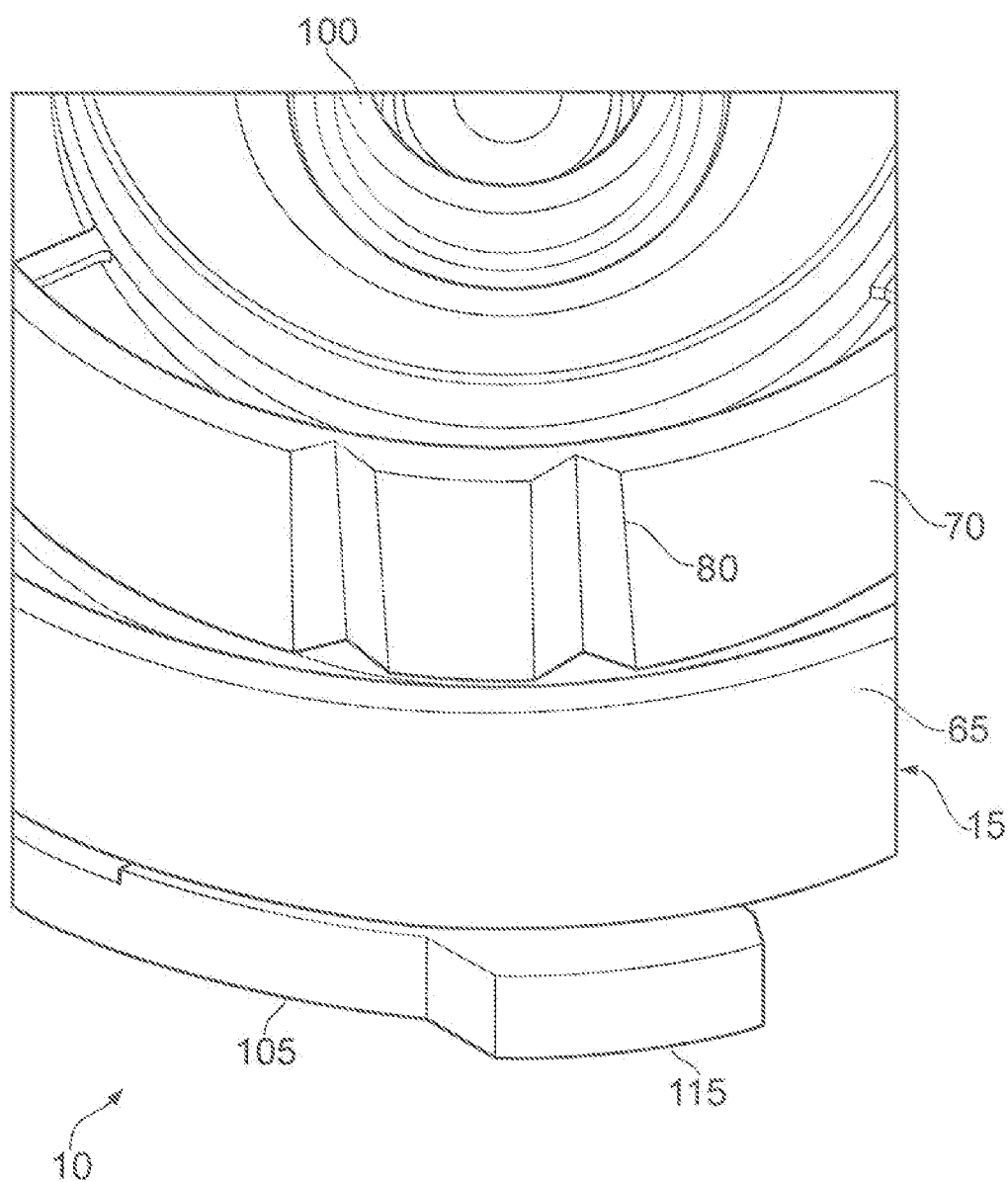
FIG. 7 (AMENDED)

NON-REUSABLE CLOSURE

CROSS REFERENCE TO RELATED APPLICATIONS

This application claims benefit under 35. U.S.C. §119 to United Kingdom Patent Application No. 1107758.3, filed May 10, 2011, and which is incorporated herein by reference for all purposes.

BACKGROUND

It is well known to provide mechanisms for indicating if a closure has been opened at least once, for example tamper evident bands and tabs. However, there are situations in which what is of more concern is ensuring that the closure has not been completely removed so that an associated container can be filled, for example with an inferior product.

SUMMARY

According to a first aspect of the present invention there is provided a closure for a container, the closure having an outer skirt and an inner skirt, the inner skirt being engagable with a container neck and comprising one or more regions of weakness arranged to break and/or deform if an attempt is made to remove the closure from a neck following first application, whereby to prevent re-application.

Therefore if the closure is removed to allow refilling of the container, the closure cannot be re-applied to the container neck because of a permanent and irreversible change to the inner skirt.

The regions of weakness may comprise one or more lines of weakness. For example localised thinning of material of the inner skirt could be used to form a region of weakness.

The regions of weakness may be frangible. Complete breakage of sections of the skirt may be preferred. Alternatively or additionally localised stretching/deforming may be preferred.

The regions of weakness may extend generally longitudinally along at least part of the length of the inner skirt. For example, axial lines of weakness, which may extend along substantially the entire length of the skirt may be used.

The inner skirt may be generally cylindrical. However, other shapes of skirt are not beyond the scope of the present invention including, for example, oval, polygonal and irregular shapes.

The inner skirt may comprise snap engagement means. A closure which snap fits onto a container neck may be particularly well suited to the present invention. A push-on closure may be formed, for example, with a snap bead on the inner skirt positioned at or towards the open end for engagement with a corresponding projection on a container neck.

In order to make removal of the closure as difficult as possible the closure may be generally cylindrical with a smooth outer finish so that there are no areas which can easily be grasped to pull it off. What is more likely is a levering action to try to pry the closure off which will increase deformation of the inner skirt.

The closure may comprise a base and a lid, with the inner and outer skirts being formed as part of the base. For example the closure may be formed as a dispensing closure with a dispensing orifice formed in the base through which product from a container can flow. The base and lid may be joined by a hinge, such as a snap hinge and/or a butterfly hinge.

The closure may comprise a self-closing valve. For dispensing closures the dispensing orifice may include a self-closing valve for regulating the flow of product from the container.

Although the primary purpose of the present invention is prevention of re-application, the closure may additionally be provided with tamper-evident means which indicate it has been opened at least once. For example, a tamper evident tab or band may be provided between a base and a lid and adapted to break if the lid is opened.

According to a further aspect of the present invention there is provided a closure as described herein in combination with a container. A pack comprising a filled container with the closure fitted is therefore contemplated.

BRIEF DESCRIPTION OF THE DRAWINGS

The present invention will now be more particularly described, by way of example, with reference to the accompanying drawings, in which:

FIG. 6 is a front perspective view of the closure of FIG. 3; and

FIG. 7 is an underplan perspective view of the closure of FIGS. 1 to 6.

DETAILED DESCRIPTION

Figure 1:
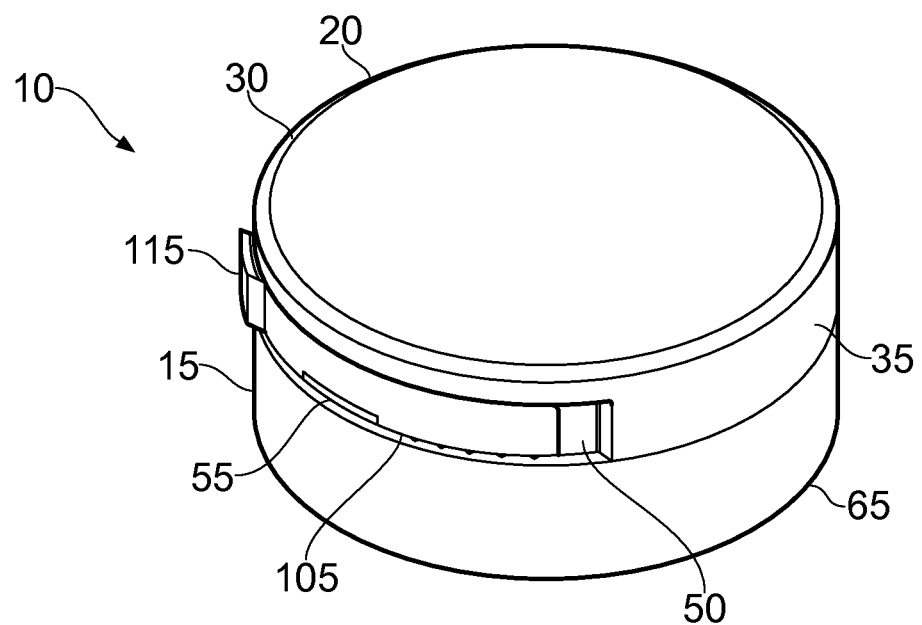
FIG. 1 is a perspective view of a closure formed according to the present invention.
Figure 2:
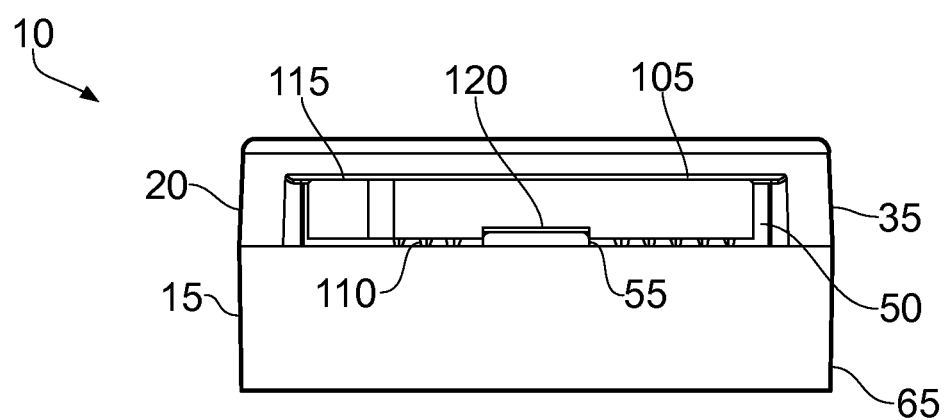
FIG. 2 is a front view of the closure of FIG. 1.
Figure 3:
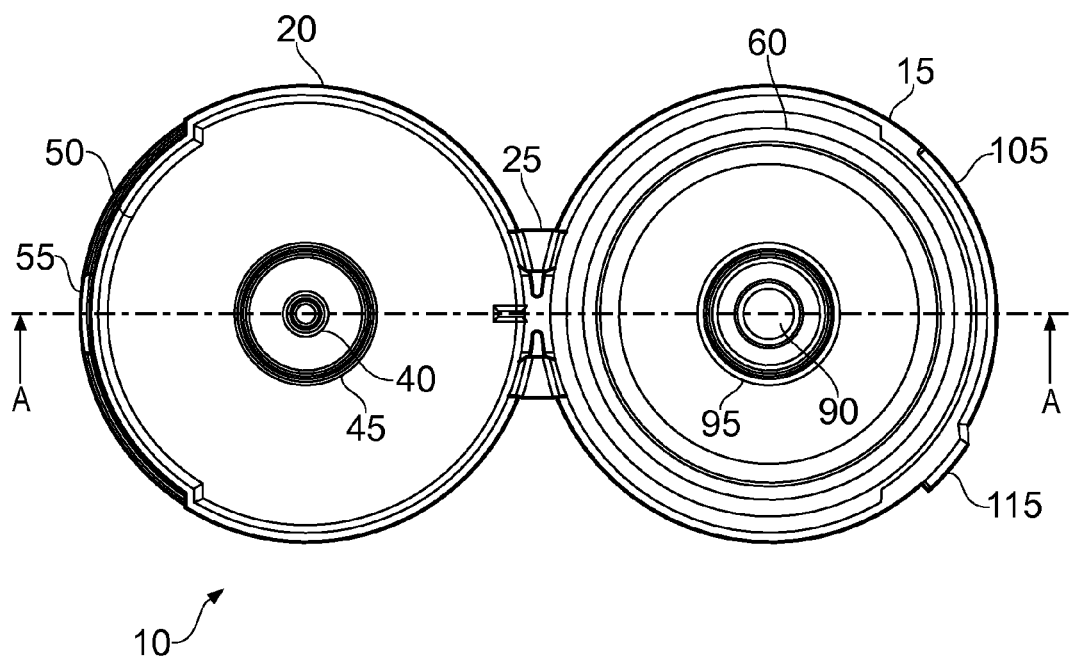
FIG. 3 is a plan view of the closure of FIG. 1 shown in an open position.

Referring now to the drawings there is shown a closure generally indicated 10. The closure 10 comprises a generally cylindrical body with a base 15 and a lid 20. The base 15 and lid 20 are connected to each other by a hinge 25.

The lid 20 comprises a circular, disc-shape top plate 30 and a generally cylindrical lid sidewall 35 which depends from the periphery of the plate 30. An annular spigot 40 depends from the centre of the plate 30 and an annular sealing projection 45 also depends from the top plate radially outwardly of the spigot 40.

Opposite the hinge 25 the lid sidewall 35 includes an arcuate recess 50 and at the centre of the recess 50 a hook 55 projects from the open end of the lid sidewall 35.

Figure 4:
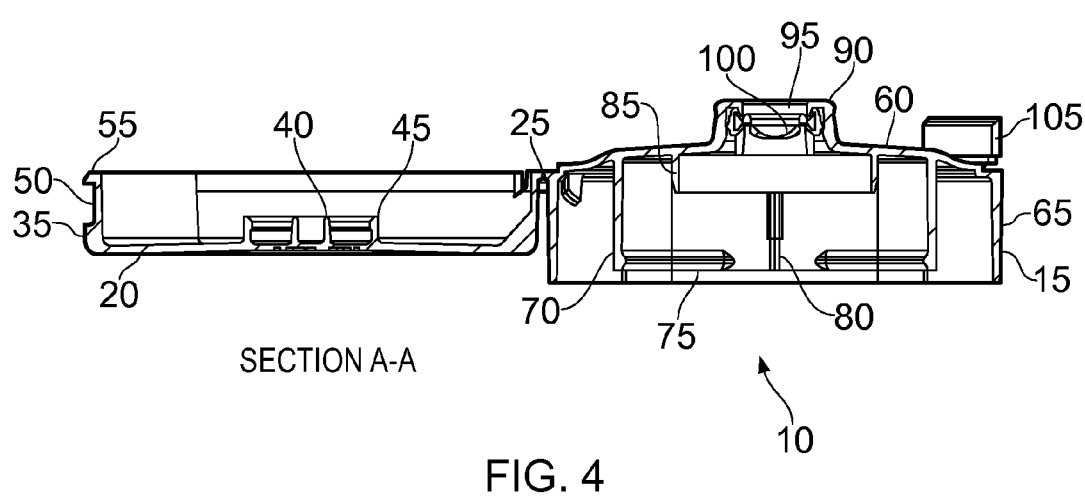
FIG. 4 is a section of the closure of FIG. 3 taken along line A-A.
Figure 5:
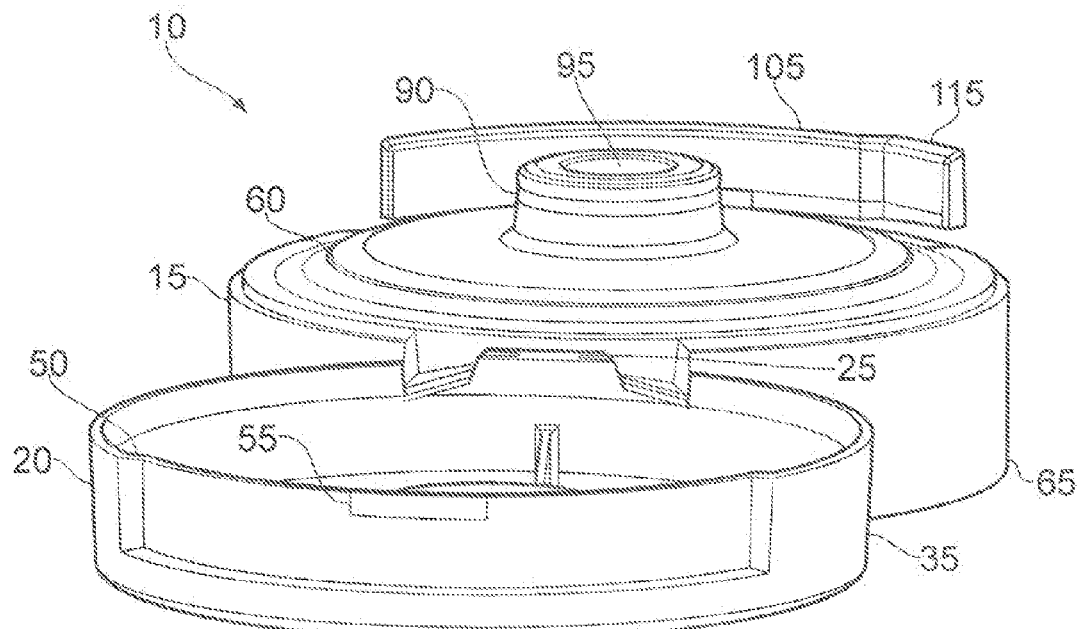
FIG. 5 is a rear perspective view of the closure of FIG. 3.

The base 15 comprises a generally circular, disc-shape top deck 60 which is gently convexly curved. A generally cylindrical outer skirt 65 depends from the periphery of the deck 60. A further, cylindrical inner skirt 70 depends from the deck 60 radially inwardly of the outer skirt 65. At the open end of the inner skirt 70 a discontinuous annular snap bead 75 is positioned. Around the circumference of the skirt 70 are a plurality of V-shape notches 80 (best shown in FIGS. 4 and 7) the purpose of which is described in more detail below.

A sealing spigot 85 depends from the deck 60 radially inwardly of the inner skirt 70 and is spaced so that a container neck can be received between the spigot 85 and the skirt 70 in use.

At the centre of the deck 60 an annular spout 90 projects and defines a central dispensing orifice 95. Within the spout 90 a self-closing valve 100 is carried.

Opposite the hinge 25 an arcuate tamper-evident band 105 upstands from the deck 60 and is connected thereto by a plurality of frangible bridges 110. At one end of the tamper-evident band 105 is a pull tab 115 which is not directly connected to the deck 60. At the centre of the band a notch 120 is provided.

In FIGS. 3 to 6 the closure 10 is shown in an as-moulded condition. Following moulding the lid 20 is folded over onto the base. In doing so, the spigot 40 is pushed into the orifice 95, the projection 45 fits around the spout 90 and the hook 55 passes behind the band 105 and snaps into the notch 120.

In use, the closure 10 is pushed on to a container neck (not shown) so that the bead 75 snap fits over a corresponding bead on the neck. Because the hook 55 is engaged in the notch 120 the lid 20 cannot be lifted away from the base until the band 105 has been removed. To remove the tamper-evident band 105 the pull tab 115 is grasped and pulled across the front of the closure, in doing so breaking the bridges 110 and allowing removal. Thereafter the lid 20 can be hinged away from the base to expose the spout 90 so that product can be dispensed through the opening 95 via the valve 100.

Removal of the closure from a container neck is inhibited by the engagement of the snap bead 75 on the container neck. However, if an attempt is made to remove the closure the lines of weakness defined by the notches 80 will break and in doing so will destroy the hoop strength of the skirt 70. Thereafter, if an attempt is made to re-apply the closure this will not be possible because the inner skirt 70 is no longer in tact.

What is claimed is:

1. A closure for a container, the closure having a lid and a base, said base containing an outer skirt and an inner skirt, the inner skirt being engagable with a container neck and comprising one or more lines of weakness along which said inner skirt is arranged to break if an attempt is made to remove the closure from a neck following first application, whereby to prevent re-application of said closure and wherein the inner skirt comprises a snap engagement means.

2. The closure as claimed in claim 1 wherein the lines of weakness are frangible.

3. The closure as claimed in claim 1 wherein the lines of weakness extend axially along the inner skirt.

4. The closure as claimed in claim 1, wherein the inner skirt is cylindrical, oval or polygonal.

5. The closure as claimed in claim 1, wherein the snap engagement means comprise a snap bead.

6. The closure as claimed in claim 5, wherein the snap bead is positioned at an open end of the inner skirt.

7. The closure as claimed in claim 5, in which the snap bead is discontinuous.

8. The closure as claimed in claim 1, in which the base and lid are joined by a hinge.

9. The closure as claimed in claim 1, wherein the closure comprises a self-closing valve.

10. The closure as claimed claim 1, wherein the closure further comprises a tamper-evident means.

11. A closure for a container, said closure having an outer skirt and an inner skirt, said inner skirt being engagable with a container neck and comprising one or more lines of weakness arranged to break or deform if an attempt is made to remove said closure from a container neck whereby to prevent re-application, wherein said inner skirt is a complete cylinder and wherein said inner skirt comprises a snap bead.

12. The closure as claimed in claim 11, wherein when the lines of weakness break the hoop strength of said inner skirt is destroyed.

13. The closure as claimed in claim 11, wherein said snap bead is discontinuous.

14. The closure as claimed in claim 11, wherein said lines of weakness comprise a V-shape notch.

15. The closure as claimed in claim 14, wherein said lines of weakness comprise a localized thinning in material of said inner skirt.

* * * * *